United States Patent
Poling, Sr. et al.

(10) Patent No.: US 7,021,992 B1
(45) Date of Patent: Apr. 4, 2006

(54) TIRE FACE GRINDER ASSEMBLY

(75) Inventors: David Poling, Sr., Akron, OH (US); Richard L. Delmoro, Tallmadge, OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 11/013,549

(22) Filed: Dec. 15, 2004

(51) Int. Cl.
*B24B 49/00* (2006.01)

(52) U.S. Cl. .......................... 451/11; 451/67

(58) Field of Classification Search ............... 451/11, 451/178, 254, 258, 920, 24, 65, 67
See application file for complete search history.

(56) References Cited

U.S. PATENT DOCUMENTS

| | | | |
|---|---|---|---|
| 3,848,368 A * | 11/1974 | Toshioka et al. ............ | 451/24 |
| 3,866,360 A | 2/1975 | Monajjem | |
| 3,905,160 A | 9/1975 | McKenney | |
| 3,932,965 A | 1/1976 | Kline, Jr. | |
| 4,041,647 A | 8/1977 | Ugo | |
| 4,071,979 A | 2/1978 | Ugo | |
| 4,084,350 A * | 4/1978 | Ongaro .......................... | 451/5 |
| 4,669,228 A | 6/1987 | Rogers | |
| 4,736,546 A | 4/1988 | Ugo | |
| 4,936,054 A | 6/1990 | Rogers et al. | |
| 5,099,613 A | 3/1992 | Rogers, Jr. | |
| 5,185,960 A | 2/1993 | Majerus et al. | |
| 6,062,950 A | 5/2000 | Morgan | |
| 6,431,963 B1 | 8/2002 | Delmoro et al. | |
| 6,620,030 B1 * | 9/2003 | Delmoro et al. ............. | 451/11 |
| 6,786,800 B1 | 9/2004 | Delmoro et al. | |

FOREIGN PATENT DOCUMENTS

JP 04296629 10/1992

* cited by examiner

*Primary Examiner*—Dung Van Nguyen
(74) *Attorney, Agent, or Firm*—Renner, Kenner, Greive, Bobak, Taylor & Weber

(57) ABSTRACT

A face grinder assembly is disclosed for removing irregularities from tire. The face grinder assembly includes an outer frame and a slide frame slidably attached to the outer frame. The slide frame is capable of vertical movement relative to the outer frame between a working position and a non-working position. A sub-assembly carried by the slide frame includes a grinding stone. The sub-assembly is configured to define a clearance for the tire in the non-working position of the slide frame.

14 Claims, 5 Drawing Sheets

TIRE FACE GRINDER ASSEMBLY

RELATED PATENT APPLICATIONS

None.

TECHNICAL FIELD

The present invention relates to a face grinder assembly in a tire uniformity machine having a sub-assembly including a grinding stone for removing irregularities from tires. In particular, the present invention relates to a face grinder assembly capable of vertically repositioning the sub-assembly upwardly to provide the necessary clearance to allow a tire having a large width to pass thereunder. More particularly, the present invention relates to a face grinder assembly having a split frame, where the portion of the split frame carrying the sub-assembly is movable relative to the remaining portion of the split frame to provide the necessary clearance.

BACKGROUND ART

A prior art face grinder assembly is generally indicated by the numeral 10 in FIG. 1. The prior art face grinder assembly 10 includes a grinding stone 20, and is used in conjunction with a tire uniformity machine 12 to remove irregularities from a tire T. The prior art face grinder assembly 10 includes a face grinder frame having two forks 22 which are attached to a bracket 23 which is mounted on the frame 14 of the tire uniformity machine 12. The forks 22 are spaced apart to accommodate a sub-assembly 24 that carries the grinding stone 20. The sub-assembly 24 includes a pivot bracket 26, which is pivotably attached between the forks 22 as by a pin 25, and includes cylindrical rails 32 supporting a carriage 33 therebetween. The carriage 33 supports a grinder head 38 which carries the grinding stone 20.

During operation of the prior art face grinder assembly 10, the sub-assembly 24 is alternately reconfigured between an upwardly inclined retracted position and a horizontally extended position. To provide the horizontally extended position, a first piston 42 is used to extend the cylindrical rails 32 and carriage 33 relative to the forks 22 such that the grinder head 38 is positioned adjacent the tire T in position P1. When located in position P1, the grinder head 38 is capable of removing the above-discussed irregularities from the tire T.

To provide the upwardly inclined retracted position, a second piston 48 is used to pivot the cylindrical rails 32 and carriage 33. In this upwardly inclined retracted position, the cylindrical rails 32 and carriage are inclined upwardly relative to a conveyer 16 by the second piston 48, and are ideally retracted relative to the forks 22 by the first piston 42.

In the upwardly inclined retracted position, a tire T is normally capable of passing underneath the sub-assembly 24 along the conveyer 16. Normally, there is clearance for a tire T to pass under the pivot bracket 26 and grinder head 38. However, tires T having larger widths are increasingly being checked for uniformity. To grind tires T having larger widths, a larger grinding stone 20 is utilized. As seen in FIG. 1, when a large width tire T is tested in the tire uniformity machine 12 having the prior art face grinder assembly 10, the tire T at position P2 will likely not pass under the grinder head 38 (even in the upwardly inclined retracted position) and at position P2' definitely will not pass under the pivot bracket 26.

One attempt at accommodating tires having larger widths has been made. This design operates on the same principle as prior art face grinder assembly 10. However, this design includes a new pivot point located farther from the tire uniformity machine 12. That is, the forks 22 are lengthened, and a new sub-assembly is pivotably attached (using a pivot bracket) between the forks 22 farther from the tire uniformity machine 12. The new sub-assembly includes lengthened cylindrical rails 32 and a lengthened carriage 33 to account for the increased distance from the pivot point to the tire uniformity machine 60.

By repositioning the pivot point, and providing a new sub-assembly with lengthened cylindrical rails and a lengthened carriage, the grinder head thereof may be raised to a greater extent relative to the conveyer 16. As such, tires T having larger widths can pass under the grinder head. Unfortunately, these tires T may still not pass under the pivot bracket, and the increased length of the forks 22 causes this design to occupy space normally used for further downstream processing of the tire T. Furthermore, the design increases the "footprint" of the tire uniformity machine 12, and requires the conveyer 16 to also be lengthened. When processing thousands of tires per day, space is at a premium, and the additional distance that a tire T must travel along the conveyer 16 adds to the processing time. Moreover, this design requires a new sub-assembly (with lengthened cylindrical rails and carriage). Consequently, the sub-assembly 24 cannot be retrofitted to existing tire uniformity machines, thereby adding expense and machine downtime.

Therefore, there is a need to provide an improved face grinder assembly capable of allowing a tire T with a large width to pass thereunder.

DISCLOSURE OF THE INVENTION

In general, the present invention contemplates a face grinder assembly for removing irregularities from tire including an outer frame, a slide frame slidably attached to the outer frame for vertical movement relative to the outer frame, where the slide frame is capable of movement between a working position and a non-working position, and a sub-assembly carried by the slide frame, where the sub-assembly defines a clearance for the tire in the non-working position of the slide frame.

The present invention also contemplates a split frame adapted to receive a grinder sub-assembly in a tire uniformity machine including an outer frame, a slide frame having an upper portion and a lower portion, where the upper portion is slidably attached to the outer frame, at least one slide assembly positioned between the outer frame and the upper portion of the slide frame, and at least one actuator positioned between the outer frame and the upper portion of the slide frame for repositioning the slide frame relative to the outer frame.

The present invention still also contemplates a face grinder assembly for removing irregularities from tires including an outer frame having a first side plate and a second side plate, a slide frame having a first sliding plate and a second sliding plate receivable within the outer frame, a grinder sub-assembly carried by the slide frame, a first slide assembly positioned between the first side plate and the first sliding plate and a second slide assembly positioned between the second side plate and the second sliding plate, and a first actuator positioned adjacent the first slide assembly and a second actuator positioned adjacent the second slide assembly, where actuation of the first actuator and the second actuator repositions the slide frame relative to the outer frame.

BEST MODE FOR CARRYING OUT THE INVENTION

Figure 1:
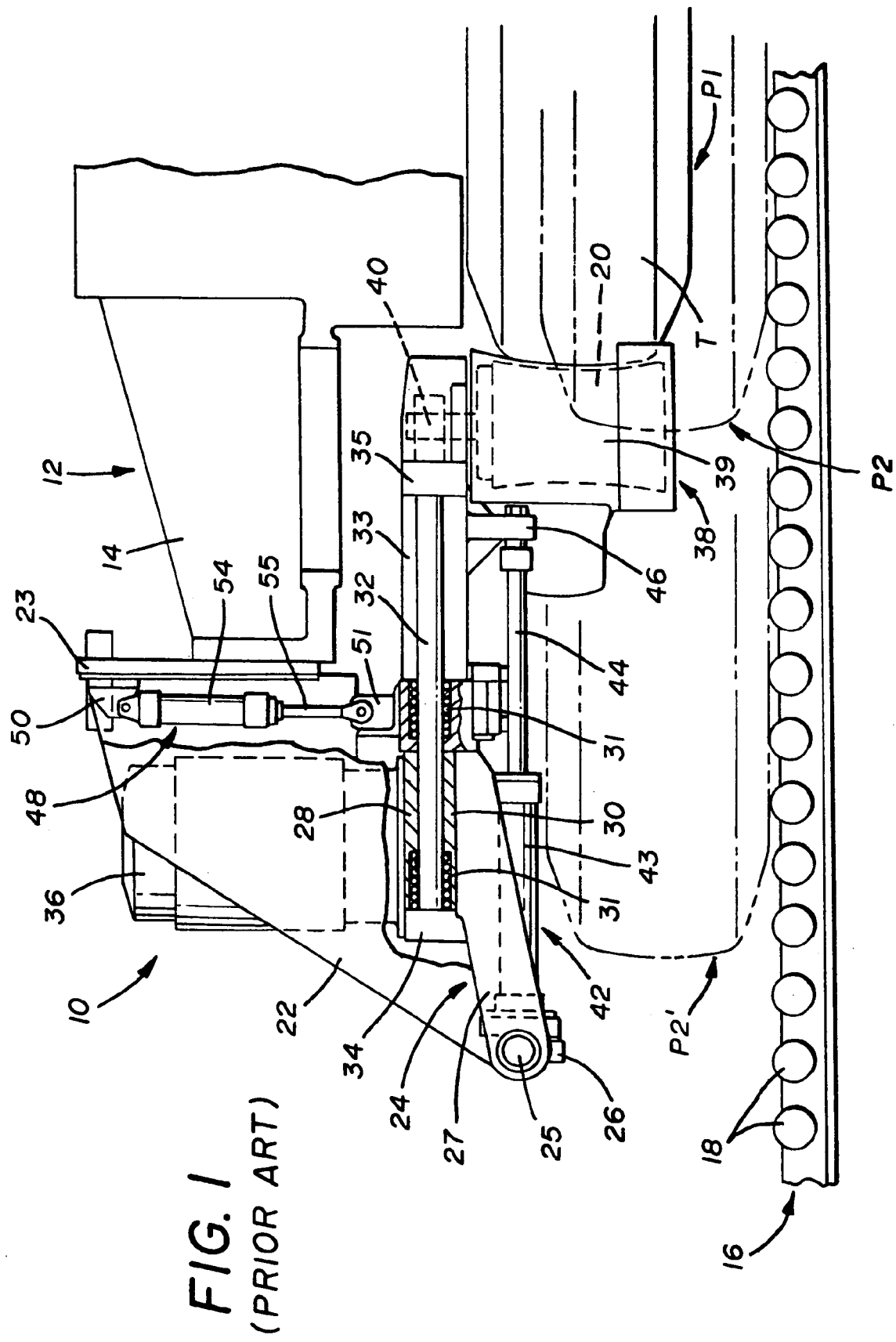
FIG. 1 is a side elevational view of a prior art face grinder assembly attached to a tire uniformity machine showing a sub-assembly carrying a grinder head.

A face grinder assembly according to the concepts of the present invention is generally indicated by the numeral 60 in FIGS. 2–5. The face grinder assembly 60 is used in a tire uniformity machine 12 to remove irregularities from a tire T. During operation of the tire uniformity machine 12, the tire T is provided in a first position P1. When in the first position P1, the tire T is rotating on a spindle (not shown) driven by the tire uniformity machine 12. The rotation of the tire T on the spindle allows the tire uniformity machine 12 to sense irregularities on the surface of tire T. The irregularities are removed using the face grinder assembly 60, and the tire T is subsequently lowered to a conveyer 16. The conveyer 16 includes various rollers 18 which move the tire T along the conveyer 16 underneath the face grinder assembly 60.

To remove the above-discussed irregularities of tire T, the face grinder assembly 60 includes a sub-assembly that carries a grinding stone 20. As shown in FIGS. 2–5, existing sub-assembly 24 may be used, thereby allowing the face grinder assembly 60 to be retrofitted to an existing tire uniformity machine 12 without having to replace the sub-assembly 24, as described more completely below. The sub-assembly 24 can be reused from the prior art face grinder assembly 10 (FIG. 1), and details of the sub-assembly not shown in FIGS. 2–5 can be seen in FIG. 1. The sub-assembly 24 is mounted on a split frame 62, which as part of the face grinder assembly 60 is capable of repositioning the sub-assembly 24 to allow tires T having larger widths to pass thereunder. Initially, the sub-assembly 24 will be described, and then the face grinder assembly 60, and its operation using the sub-assembly 24 will be described.

The sub-assembly 24 includes a pivot bracket 26 which is pivotably attached to the split frame 62 of the face grinder assembly as by a pin 25. Attached to the pivot bracket 26 are arms 27 for supporting a collar 28. With reference to FIG. 1, the collar 28 includes cylindrical apertures 30 and linear bearings 31 disposed within the cylindrical apertures 30. Cylindrical rails 32 are partially disposed within the cylindrical apertures 30, and are supported by the linear bearings 31 for reciprocal movement.

The cylindrical rails 32 are adapted to allow a carriage 33 to move in relation to the tire uniformity machine 12. The cylindrical rails 32 are spaced at either end by bracket supports 34 and 35, and the carriage 33 extends between the bracket supports 34 and 35. One end of the carriage 33 supports a motor 36 for rotating the grinding stone 20, and the other of the carriage 33 supports a grinding head 38. The grinding head 38 rotatably carries the grinding stone 20 inside a grinder housing 39 on a shaft 40. The shaft 40 is driven by a belt (not shown) extending between the motor 36 and the grinder housing 39. Because the carriage 33 is attached between the bracket supports 34 and 35, and the bracket supports 34 and 35 are attached to the cylindrical rails 32, the cylindrical rails 32 and carriage 33 are capable of synchronized reciprocal motion relative to the collar 28 using a first piston 42.

As seen in FIG. 1, the first piston 42 includes a base 43 attached to the pivot bracket 26, and a reciprocating arm 44 extending outwardly from the base 44. The distal end of the reciprocating arm 44 is attached to a piston bracket 46 provided on the carriage 33 adjacent the grinder housing 39. Reciprocation of the reciprocating arm 44 translates into linear motion of the cylindrical rails 32 within the linear bearings 31, and such linear motion repositions the carriage 33 and grinder head 38 attached to the carriage 33 relative to collar 28. As such, the first piston 42 can actuate movement of the carriage 33 to effectively locate the grinder head 38 (including the grinding stone 20) relative to the tire T.

Figure 5:
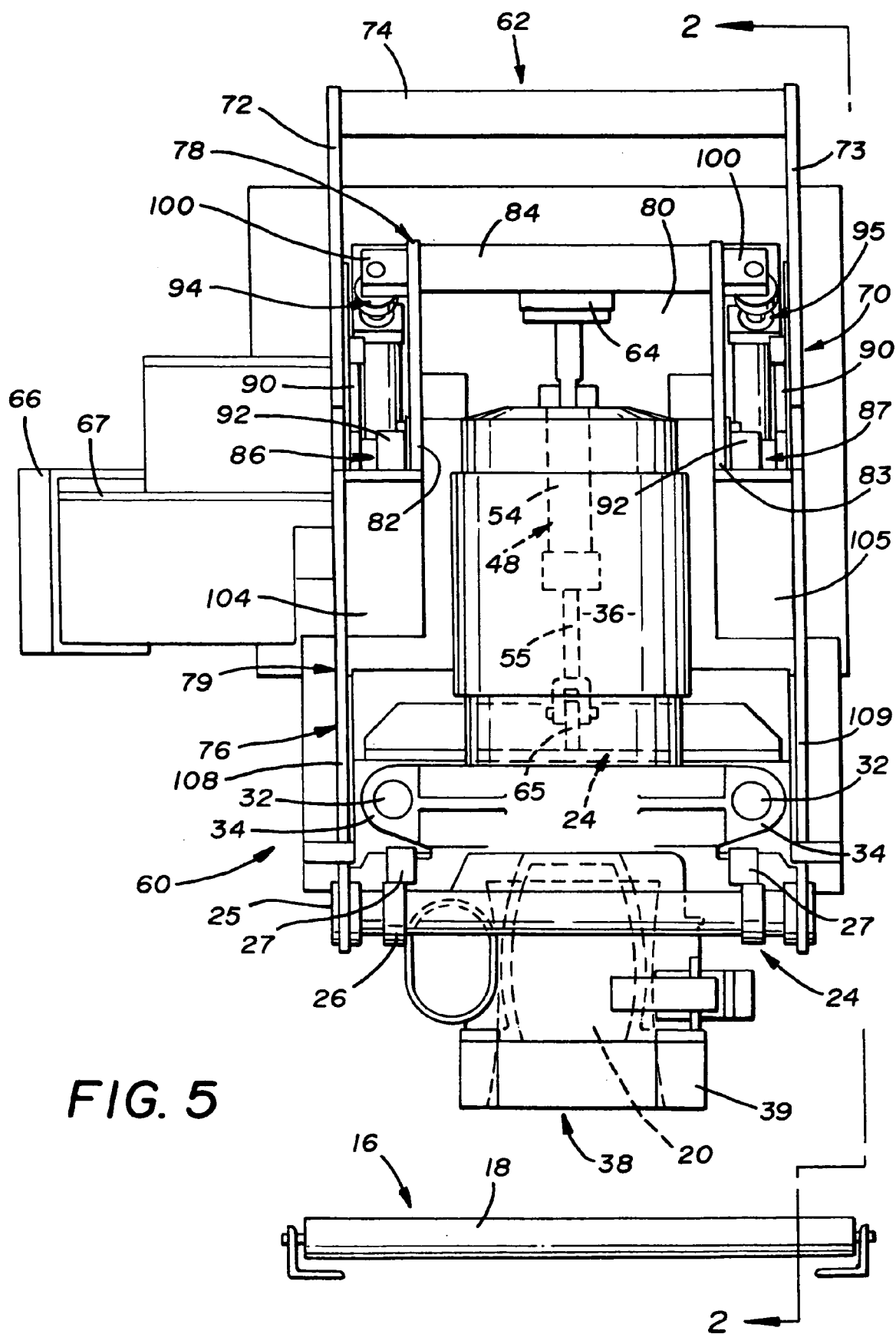
FIG. 5 is a front elevational view of the face grinder assembly according to the present invention shown in FIG. 2.

A second piston 48 is provided to pivot the grinding stone 20 about the pin 25. In the prior art face grinder assembly 10, the second piston 48 is pivotably attached to the bracket 23 using a support bracket 50, and is pivotably attached to the collar 28 using a support bracket 51. However, when the sub-assembly 24 is used in the face grinder assembly 60, the second piston 48 is pivotably attached to the split frame 62 using a first support bracket 64, and is pivotably attached to the collar 28 using a second support bracket 65. As seen in FIG. 5, the second piston 48 includes a base 54 positioned adjacent the first support bracket 64, and a reciprocating arm 55 extending outwardly from the base 54. In the face grinder assembly 60, the reciprocating arm 55 is attached to the second support bracket 65. Reciprocation of the reciprocating arm 55 provides for the pivotal movement of the collar 28, which translates into vertical movement of the sub-assembly 24 (including the grinder head 38) relative to the conveyer 16.

When processing using the sub-assembly 24 in the prior art face grinder assembly 10 is complete, the sub-assembly 24 must be reconfigured to allow for removal of the tire T from the tire uniformity machine 12. In the prior art face grinder assembly 10, the first piston 42 is actuated to retract the grinder head 38 from adjacent the tire T, and the second piston 48 is actuated to angularly orient the cylindrical rails 32, thereby vertically repositioning the sub-assembly 24 (including the grinder head 38) relative to the conveyer 16. The movement of sub-assembly 24 from the horizontally extended position to the upwardly inclined retracted position of the prior art face grinder assembly 10 normally allows a T to exit the tire uniformity machine. Therefore, when moved from position P1 to positions P2 and P2' in FIG. 1, the tire T is normally capable of moving underneath the grinding head 38 along the conveyer 16.

However, when a tire T has a large width (as seen in FIG. 1), the tire T will not fit under the sub-assembly 24. That is, at position P2 the tire T may not fit underneath the grinder head 38, and at position P2' the tire T may not pass underneath the pivot bracket 26. As such, reconfiguration of the sub-assembly 24 into the upwardly inclined retracted position may not provide enough clearance to allow a tire T with a large width to pass underneath the sub-assembly 24.

The face grinder assembly 60 according to the present invention is adapted to reposition the sub-assembly 24 to allow a tire T having a large width to pass thereunder. The face grinder assembly 60 may be pivotably attached to the frame 14 of the tire uniformity machine 12. As seen in FIG. 5, the face grinder assembly includes a hinge bracket 66 fixedly attached to the frame 14, and integrally provided as part of the face grinder assembly 60. The hinge bracket 66 is adapted to accept a leaf bracket 67, and allows the face grinder assembly 60 to pivot between an operating position and an open position. When in the open position, access is provided to the interior of the tire uniformity machine 12, and allows the tire uniformity machine 12 and face grinder assembly 60 to be serviced or otherwise maintained.

When in the operating position, the face grinder assembly 60 is capable of reconfiguring itself to both engage the tire T and allow the tire T to pass underneath. As discussed above, the face grinder assembly 60 includes the sub-assembly 24 which can be retrofitted from the prior art face grinder assembly 10 or can be provided as original equipment. However, unlike the prior art face grinder assembly 10, the face grinder assembly 60 is capable of repositioning the sub-assembly 24 to allow a tire T having a large width to pass thereunder. To that end, the face grinder assembly 60 is capable of movement between a working position (FIG. 2) and a non-working position (FIGS. 3 and 4) to provide the clearance necessary to allow passage of tires T with a larger widths.

Figure 2:
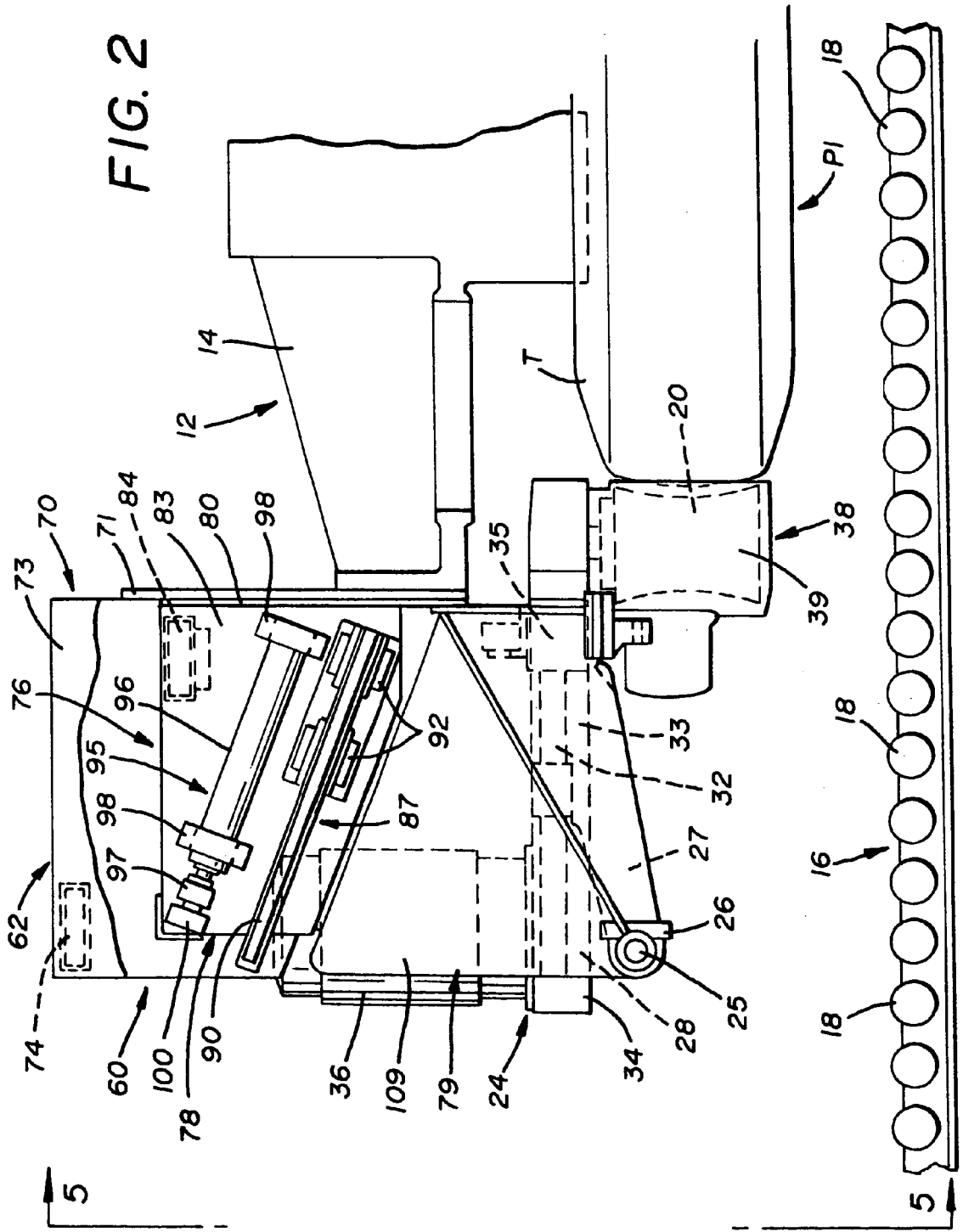
FIG. 2 is a side elevational view of a face grinder assembly according to the present invention attached to a tire uniformity machine showing the sub-assembly of FIG. 1 housed therein with the face grinder assembly located in the working position.
Figure 3:
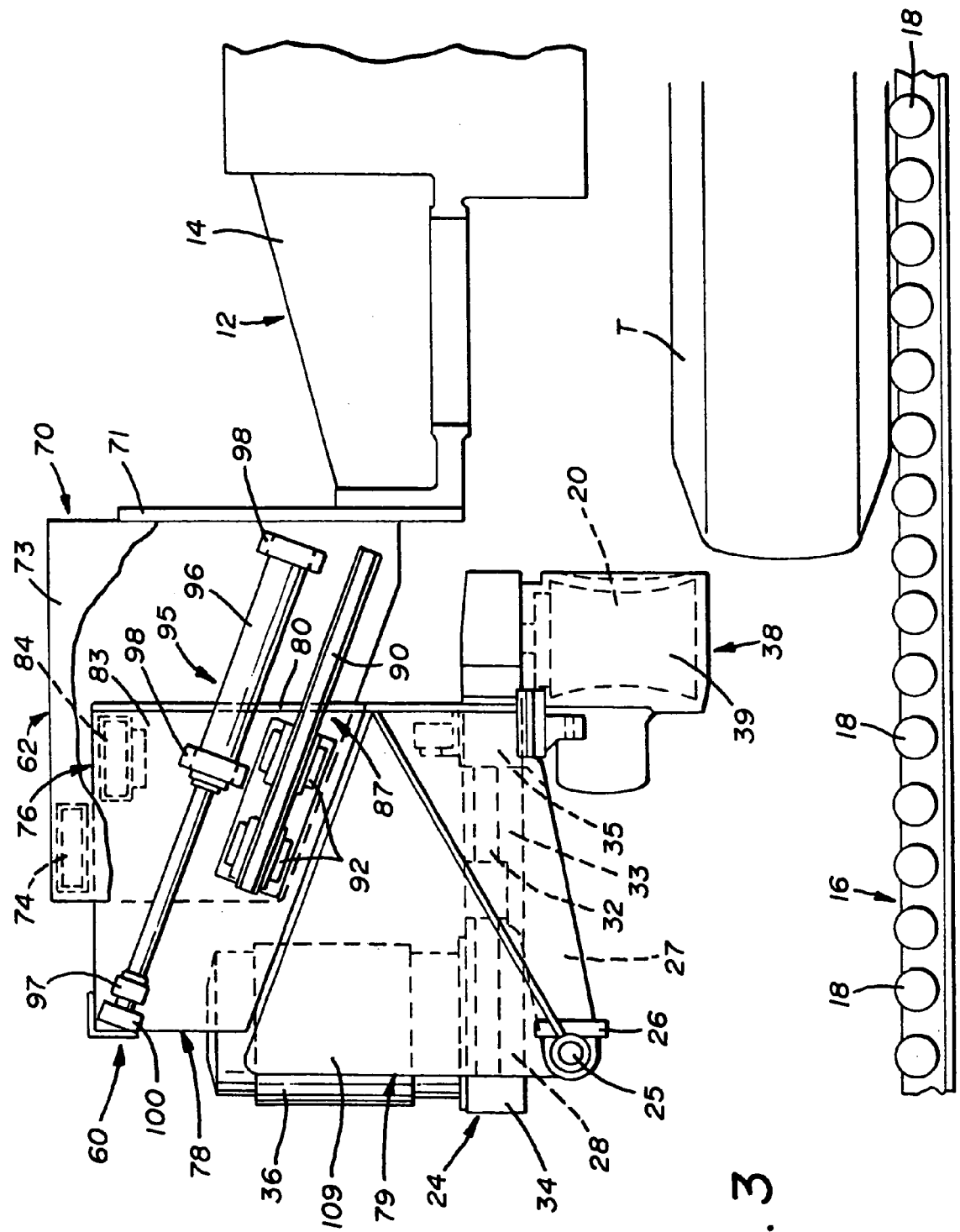
FIG. 3 is a side elevational view of the face grinder assembly attached to the tire uniformity machine shown in FIG. 1 where the face grinder assembly is located in a non-working position.

During operation of the face grinder assembly 60 and the tire uniformity machine 12, the tire T is provided in a first position P1 as seen in FIG. 2. As discussed above, the tire T is rotating on a spindle (not shown) driven by the tire uniformity machine 12 when in the first position P1. The rotation of the tire T allows irregularities to be removed using the face grinder assembly 60. Thereafter, the tire T is lowered to a conveyer 16, and moved by various rollers 18 to a position P3 (FIG. 3).

As seen best in FIG. 5, the face grinder assembly 60 employs the split frame 62 to effectively reposition the sub-assembly 24 so that tires T having larger widths can pass thereunder. The split frame 62 includes an outer frame 70 having a back plate 71, a first side plate 72, a second side plate 73, and a top plate 74. The first and second side plates 72 and 73 are spaced apart to accommodate the remainder of the face grinder assembly 60, and the leaf bracket 67 is connected to the first side plate 72. Disposed between the first and second side plates 72 and 73 is another portion of the split frame 62, referred to as a slide frame 76.

The slide frame 76 is partially positioned within the outer frame 70, and includes an upper portion 78 and a lower portion 79. The upper portion 78 includes a backing plate 80, a first sliding plate 82 and second sliding plate 83. Spacing the first and second sliding plates 82 and 83 is a top plate 84. The backing plate 80 in conjunction with the top plate 84 maintains the structural integrity of the upper portion 78.

The first and second sliding plates 82 and 83 are receivable within the outer frame 70, and are slidably attached to the first and second side plates 72 and 73, respectively, thereby allowing the slide frame 76 to move relative to the outer frame 70. To facilitate such movement, first and second slide assemblies 86 and 87 are positioned between the first side plate 72 and first sliding plate 82 and between the first side plate 73 and first sliding plate 83, respectively. The first and second slide assemblies 86 and 87 are upwardly inclined, and each include tracks 90 and slide trucks 92 movable along the tracks 90. The tracks 90 are attached on the inside portions of the first and second side plates 72 and 73 of the outer frame 70, and the slide trucks 92 are attached to the outside portions of the first and second sliding plates 82 and 83 of the slide frame 76. The first and second slide assemblies 86 and 87 allow for the slidable movement of the slide frame 76 relative to the outer frame 70 in an angular direction.

Figure 4:
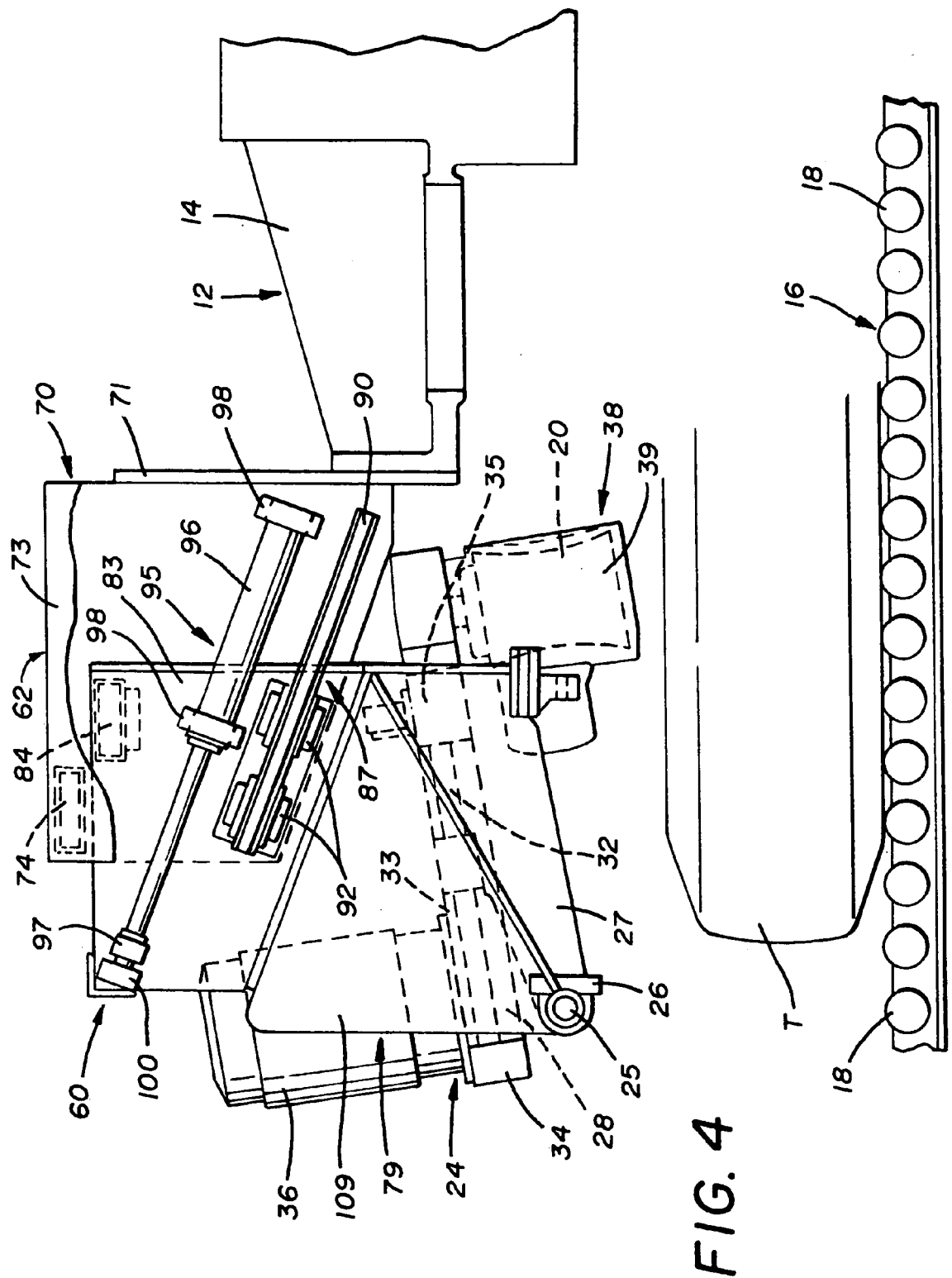
FIG. 4 is a side elevational view of the face grinder assembly attached to the tire uniformity machine shown in FIG. 1 where the face grinder assembly is located in the non-working position, and the sub-assembly located in an upwardly inclined position with the grinding stone raised.

Positioned adjacent and parallel to the first and second slide assemblies 86 and 87 are actuators, which may be pistons 94 and 95, as shown. Each of the pistons 94 and 95 can be angularly oriented, and include a base 96 and a reciprocating arm 97 extending outwardly from the base 96. Each base 96 is fixedly attached at either end to the inside portions of the first and second side plates 72 and 73 using brackets 98. Furthermore, each reciprocating arm 97 is fastened at its distal end to a bracket 100 on the outside portions of the first and second sliding plates 82 and 83. As such, the base 96 of each of the angularly-oriented pistons 94 and 95 is attached to the outer frame 70, and the reciprocating arm 97 of each of the pistons 94 and 95 is attached to the slide frame 76. Actuation of the reciprocating arms 97 serves to move the slide frame 76 in an angular direction relative to the outer frame 70. The angularity of such slidable movement includes a horizontal component and a vertical component, and displaces the slide frame 76 from its working position (as seen in FIG. 2) to its non-working position (as seen in FIGS. 3 and 4).

Joining the upper portion 78 and lower portion 79 are first and second transition plates 104 and 105. The first and second transition plates 104 and 105 are respectively attached to the first and second sliding plates 72 and 73, and to first and second support plates 108 and 109 of the lower portion 79. The first and second transition plates 104 and 105 effectively space the first and second support plates 108 and 109 apart from the first and second sliding plates 72 and 73, respectively, to provide space for positioning the sub-assembly 24 therebetween.

The sub-assembly 24 is carried by the slide frame 76, and includes the pivot bracket 26 which is pivotably attached between the first and second support plates 108 and 109 by the pin 25. As discussed above, the carriage 33 (supported by the cylindrical rails 32) is capable of reciprocal motion relative to the collar 28 using the first piston 42. As such, after the slide frame 76 moves from the non-working position (FIGS. 3 and 4) to the working position (FIG. 2), the first piston 42 can actuate movement of the carriage 33 to effectively locate the grinder head 38 (including grinding stone 20) relative to the tire T.

Furthermore, in the face grinder assembly 60, the second piston 48 is used to pivot the collar 28 relative to the first and second support plates 108 and 109 between a horizontal position and an upwardly inclined position. As discussed above, the second piston 48 is pivotably attached to the top plate 84 using the first support bracket 64, and is also pivotably attached to the collar 28 using a second support bracket 65. As seen in FIG. 1, reciprocation of the reciprocating arm 55 provides for the pivotal movement of the collar 28 relative to the first and second support plates 108 and 109 which translates into further vertical movement of the sub-assembly 24 (including the grinder head 38) relative to the conveyer 16.

As seen in FIG. 2, the grinder head 38 is positioned directly adjacent the tire T in position P1 because the slide frame 76 is in the working position, and the sub-assembly 24 is in the horizontal position. As such, the grinder head 38 is positioned to allow the grinding stone 20 to contact the surface of the tire T and remove any irregularities.

To allow for removal of the tire T after processing, the slide frame 76 is moved to its non-working position (FIGS. 3 and 4), and, if necessary, the sub-assembly 24 is moved to its upwardly inclined position (FIG. 4). As seen in FIGS. 3 and 4, the slide frame 76 is initially moved from its working position to its non-working position. To that end, the reciprocating arm 97 of each of the angularly-oriented pistons 94 and 95 is actuated to reposition the slide frame 76 relative to the outer frame 70. In the example shown, in moving from the working position (FIG. 2), the angularly-oriented pistons 94 and 95 drive the slide frame 76 outward and upward relative to the frame 14 of the tire uniformity machine 12. Because the sub-assembly 24 is attached to the slide frame 76, the grinder head 38 (and remainder of the sub-assembly 24) is repositioned both vertically and horizontally by movement of the slide frame 76. As seen in FIG. 3, the vertical component of the slidable movement of the slide frame 76 provides clearance beneath the grinder head 38 and grinding stone 20.

Thereafter, as seen in FIG. 4, to provide further clearance beneath the grinder head 38 and grinding stone 20, the sub-assembly 24 is reconfigured from its horizontal position to its upwardly inclined position. To that end, the second piston 48 is actuated to incline the cylindrical rails 32 and carriage 33, and vertically reposition the sub-assembly 24 (including the grinder head 38 and grinding stone 20) relative to the conveyer 16.

Repositioning the slide frame 76 in the non-working position, and repositioning the sub-assembly 24 in the upwardly inclined position defines the clearance necessary to allow a tire T having a large width to pass underneath the sub-assembly 24 along the conveyer 16, and move from the position P3 to a position P4.

By using split frame 62, the necessary clearance may be obtained without increasing the length of sub-assembly 24. As a result, existing sub-assembly 24 may be reused when retrofitting the face grinder assembly 60, and the original footprint of the prior art face grinder assembly 10 is substantially maintained. Consequently, downstream equipment does not have to be reposition, and a processing time is preserved.

Thus, it should be evident that the face grinder assembly 60 disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A face grinder assembly for removing irregularities from tire, comprising:
   an outer frame;
   a slide frame slidably attached to said outer frame for vertical movement relative to said outer frame, said slide frame capable of movement between a working position and a non-working position; and
   a sub-assembly carried by said slide frame, wherein said sub-assembly defines a clearance for the tire in said non-working position of said slide frame.

2. A face grinder assembly according to claim 1, further comprising at least one slide assembly positioned between said outer frame and said slide frame, wherein said at least one slide assembly allows for slidable movement of said slide frame relative said outer frame; and
   a grinding stone included with said sub-assembly for removing the irregularities from the tire.

3. A face grinder assembly according to claim 2, wherein said slide frame includes an upper portion and a lower portion, and said upper portion has a first sliding plate and a second sliding plate spaced apart and said lower portion has a first spaced support plate and a second spaced support plate, said sub-assembly being positioned between said first support plate and said second support plate.

4. A face grinder assembly according to claim 3, wherein said outer frame includes a first side plate and a second side plate, a first slide assembly being positioned between said first side plate and said first sliding plate and a second slide assembly being positioned between said second side plate and said second sliding plate.

5. A face grinder assembly according to claim 4, further comprising a piston positioned between said first side plate and said first sliding plate adjacent to said first slide assembly and a piston positioned between said second side plate and said second sliding plate adjacent to said second slide assembly, wherein said first and second slide assemblies include tracks attached to said first and second side plates, and slide trucks attached to said first and second sliding plates, said pistons capable of being actuated to move side slide trucks along said tracks, and reposition said slide frame in a non-working position.

6. A face grinder assembly according to claim 5, wherein said first and second slide assemblies and said pistons are upwardly inclined, and actuation of said pistons both horizontally and vertically displaces said slide frame relative to said outer frame.

7. A split frame adapted to receive a grinder sub-assembly in a tire uniformity machine, comprising:
   an outer frame;
   a slide frame having an upper portion and a lower portion, wherein said upper portion is slidably attached to said outer frame;
   at least one slide assembly positioned between said outer frame and said upper portion of said slide frame; and
   at least one actuator positioned between said outer frame and said upper portion of said slide frame for repositioning said slide frame relative to said outer frame.

8. A split frame according to claim 7, wherein said upper portion of said slide frame can be positioned within said outer frame, and said at least one actuator is positioned adjacent said at least one slide assembly, actuation of said at least one actuator repositioning said slide frame relative to said outer frame.

9. A split frame according to claim 8, wherein said lower portion of said slide frame has a first spaced support plate and a second spaced support plate, and the sub-assembly is positioned between said first spaced support plate and said second spaced support plate.

10. A split frame according to claim 9, wherein said upper portion of said slide frame has a first sliding plate and a second sliding plate, and said outer frame has a first side plate and a second side plate, a first slide assembly being positioned between said first sliding plate and said first side plate and a second slide assembly being positioned between said second sliding plate and said second side plate.

11. A split frame according to claim 10, wherein said first slide assembly includes tracks attached to said first side plate and trucks attached to said first sliding plate, and wherein said second slide assembly includes tracks attached to said second side plate and trucks attached to said second sliding plate, a first actuator being positioned adjacent said first slide assembly and a second actuator being positioned adjacent said second slide assembly.

12. A split frame according to claim 11, wherein said first actuator is a piston including a reciprocating arm attached to said first sliding plate and said second actuator is a piston including a reciprocating arm attached to said second slide plate, actuation of said first actuator and said second actuator serving to move said slide frame in an angular direction relative to said outer frame, thereby repositioning said the split frame between a working position and a non-working position.

13. A split frame according to claim 12, further comprising a top plate extending between said first sliding plate and said second sliding plate, wherein a piston is attached to said top plate and said sub-assembly, actuation of said piston pivoting said sub-assembly relative to said first support plate and said second support plate.

14. A face grinder assembly for removing irregularities from tires, comprising:

an outer frame having a first side plate and a second side plate;

a slide frame having a first sliding plate and a second sliding plate receivable within said outer frame;

a grinder sub-assembly carried by said slide frame;

a first slide assembly positioned between said first side plate and said first sliding plate and a second slide assembly positioned between said second side plate and said second sliding plate; and a first actuator positioned adjacent said first slide assembly and a second actuator positioned adjacent said second slide assembly, wherein actuation of said first actuator and said second actuator repositions said slide frame relative to said outer frame.

* * * * *